March 24, 1959

J. T. CARLETON
GENERATOR POWER FACTOR, VOLTAGE
AND CURRENT CONTROL APPARATUS 2,879,464

Filed Jan. 16, 1958

WITNESSES:
Bernard R. Gregory
Clement L. McHale

INVENTOR
James T. Carleton

BY F. E. Browder
ATTORNEY

United States Patent Office 2,879,464
Patented Mar. 24, 1959

2,879,464

GENERATOR POWER FACTOR, VOLTAGE AND CURRENT CONTROL APPARATUS

James T. Carleton, Forest Hills, Pa., assignor to Westinghouse Electric Corporation, East Pittsburgh, Pa., a corporation of Pennsylvania Application January 16, 1958, Serial No. 709,234

8 Claims. (Cl. 322—24)

This invention relates to control apparatus and more particularly to excitation systems.

In a conventional static excitation system for an alternating current generator which is supplying power to a unity or lagging power factor load, it is customary to provide a first component of the total excitation which is responsive to the output voltage of the generator and which provides adequate excitation under no-load conditions. A second component of excitation is effective, in addition to the first component, when the generator is loaded and is obtained by rendering current transformers responsive to the load current and then rectifying the output of the current transformers before applying the output to the excitation field winding of the generator. It has been found that on metropolitan electric power systems the light system load conditions are increasingly becoming a leading power factor type because of quantities of shunt capacitors and cable connected to such systems. With a conventional static excitation system employing current transformers to provide part of the total excitation under load, the amount of excitation supplied by the current transformers for a given power factor and load is the same for both leading and lagging power factors of the same magnitude. Since more excitation is required for a lagging power factor load than for a leading power factor load of the same value, a conventional static excitation system adjusted to give the proper amount of excitation for lagging power factor loads will supply excessive excitation for leading power factor loads. In other words, for a particular leading power factor load greater than a certain value, the current transformers in a conventional static excitation system will supply a larger component of the total excitation than is required, and the output voltage of an alternating current generator will rise in an uncontrolled manner, preventing operation of the generator in that region of loading. It is therefore desirable that a static excitation system be provided in which the portion of the total excitation supplied by the current transformers will not be excessive for loads having a leading power factor in order to take maximum advantage of the leading power factor capabilities of an alternating current generator.

It is an object of this invention to provide a new and improved excitation system for a dynamoelectric machine.

Another object of this invention is to provide a new and improved regulating system for controlling the excitation of a dynamoelectric machine.

A more specific object of this invention is to provide a new and improved static excitation system for a dynamoelectric machine disposed to supply a load of varying power factor, in which excessive excitation for a load having a leading power factor is prevented.

Other objects of the invention will in part be obvious and will in part appear hereinafter. For a fuller understanding of the nature and objects of the invention, references should be had to the following detailed description taken in connection with the accompanying drawings in which.

Figure 1A:
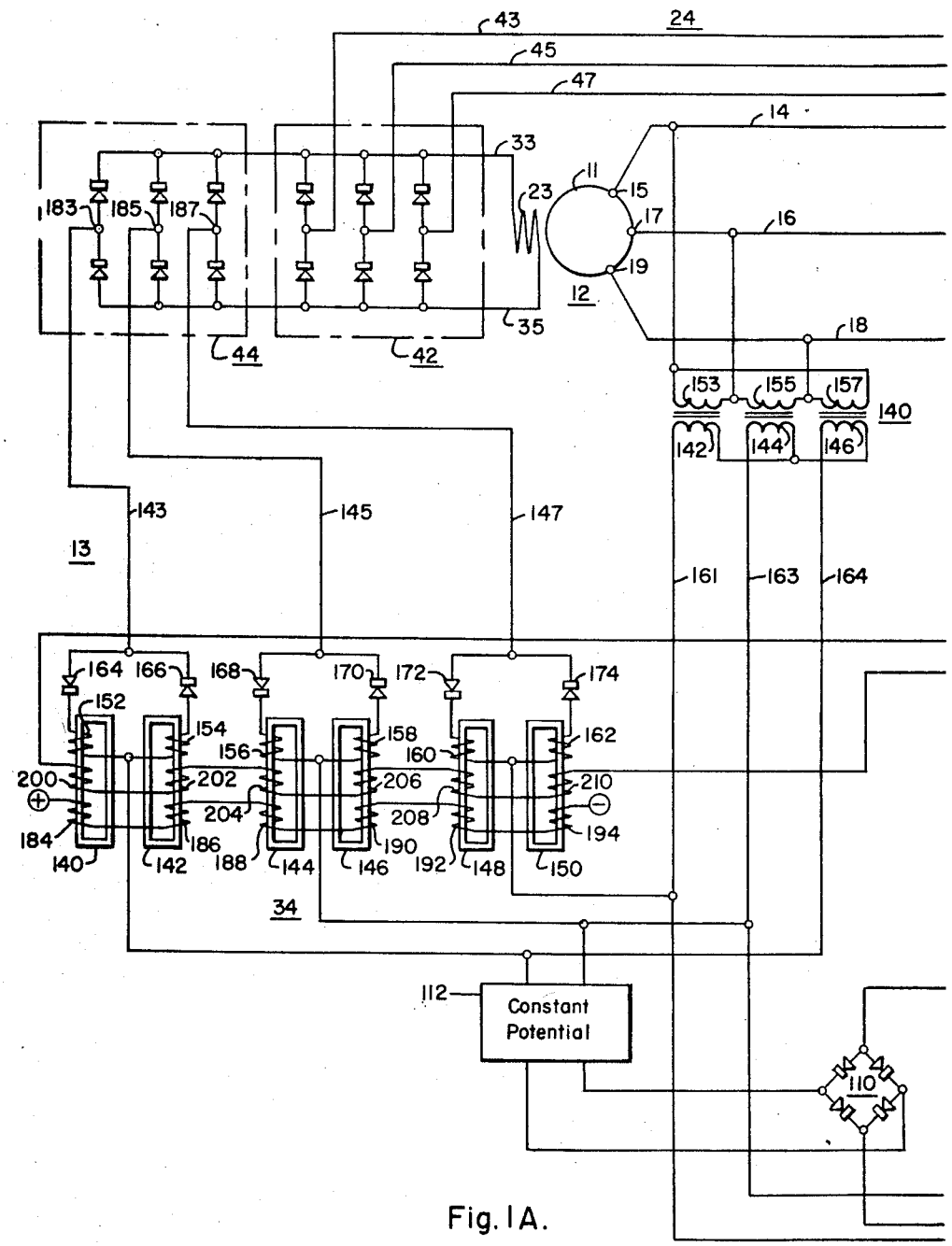
Figures 1A and 1B are a schematic diagram of apparatus and circuits illustrating this invention.
Figure 1B:
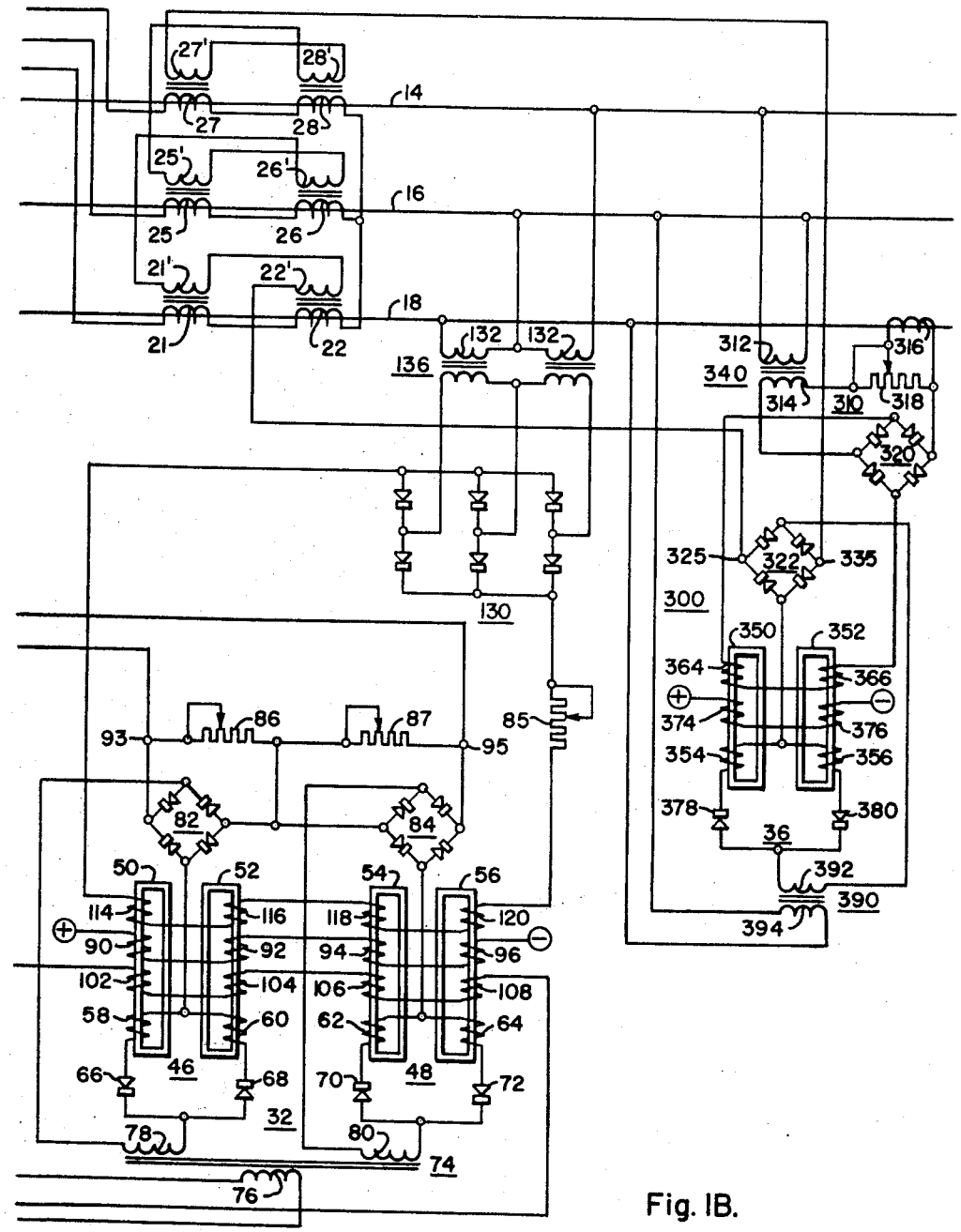

Referring to Figs. 1A and 1B of the drawings, there is illustrated generally an excitation system for maintaining the output voltage of a dynamoelectric machine, specifically a three-phase alternating current generator 12, at substantially a predetermined value. The excitation system comprises in general a boost excitation system 24 and a regulator system 13. In operation under normal load conditions, the boost excitation system 24 provides a portion of the total excitation required for the dynamoelectric machine or generator 12. The balance or remainder of the excitation is supplied by the regulator system 13. However, under three-phase short circuit conditions, the boost excitation system 24 supplies all of the needed generator excitation. On the other hand, under no load conditions the regulator system 13 provides the necessary generator excitation.

In the embodiment of Figs. 1A and 1B, the generator 12 comprises an armature 11 and an excitation field winding 23. As illustrated, the generator 12 is disposed to supply alternating current energy to the load conductors 14, 16 and 18 through the output terminals 15, 17 and 19 of the armature 11 of the generator 12. In order to obtain a proportion of the excitation required by the generator 12 which varies with the output load current of the generator 12, the current transformers 21, 22, 25, 26, 27 and 28 are disposed in inductive relationship with the load conductors 14, 16 and 18. The current transformers 21, 22, 25, 26, 27 and 28 have the additional windings 21', 22', 25', 26', 27' and 28' disposed on a common core with each of the current transformers 21, 22, 25, 26, 27 and 28, respectively. The purpose of the additional windings 21', 22', 25', 26', 27' and 28' will be explained hereinafter. As illustrated, the load conductors 14, 16 and 18 constitute a primary winding for each pair of the current transformers 21 and 22, 25 and 26, and 27 and 28, respectively. However, it is to be known that separate primary windings (not shown) could be provided for the current transformers 21, 22, 25, 26, 27 and 28. These primary windings (not shown) would be connected in series circuit relationship with the load conductors 14, 16 and 18. Each pair of the current transformers 21 and 22, 25 and 26, and 27 and 28 are connected in series circuit relationship, with one end of each of the current transformers 22, 26 and 28 connected to a common terminal in a Y arrangement.

In order to rectify the alternating current output of the current transformers 21, 22, 25, 26, 27 and 28, a three-phase dry type rectifier 42 is provided. As illustrated, the input terminals of the rectifier 42 are interconnected with one end of each of the current transformers 21, 25 and 27 by means of the conductors 43, 45 and 47, respectively. On the other hand, the output terminals of the rectifier 42 are connected to the field winding 23 of the generator 12 by means of the conductors 33 and 35 to thereby render the field winding 23 responsive to the currents induced in the current transformers 21, 22, 25, 26, 27 and 28. In operation, the rectifier 42 functions as a three-phase, full wave rectifier to rectify the currents induced in the current output windings of the transformers 21 and 22, 25 and 26, and 27 and 28 by the current which flows in the load conductors 14, 16 and 18, respectively, as affected by the current which flows in the additional windings 21' and 22', 25' and 26', and 27' and 28', respectively.

In accordance with the teachings of this invention, in order to prevent excessive excitation of the generator 12 for leading power factor loads above a certain value, the power factor sensing circuit 300 is connected in circuit relationship with the additional windings 21', 22', 25', 26', 27' and 28' associated with the current transformers 21, 22, 25, 26, 27 and 28, respectively. Each of the current transformers 21 to 28 and its associated additional winding are disposed on a common magnetic core. In general, the power factor sensing circuit 300 provides an output signal which varies with the power factor and the magnitude of whatever load is connected to the load conductors 14, 16 and 18. The output signal from the sensing circuit 300 is then applied to the additional windings 21', 22', 25', 26', 27' and 28' associated with each of the current transformers 21, 22, 25, 26, 27 and 28, respectively, to reduce the amount of excitation supplied by the latter current transformers when the power factor of the load connected to the load conductors 14, 16 and 18 is leading.

Figure 2:
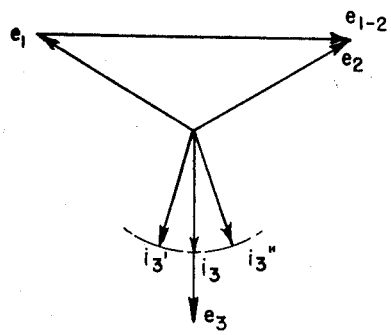
Figs. 2 and 3 are vector diagrams explanatory of the operation of the power factor sensing circuit shown in Figs. 1A and 1B.

In particular, the power factor sensing circuit 300 comprises the circuit means 310, responsive to both a measure of the terminal voltage of the generator 12 and to a measure of the output current of the generator 12 for obtaining an output signal which varies with the power factor of the load (not shown) connected to the load conductors 14, 16 and 18 and a magnetic amplifier 36. Specifically, the circuit means 310 comprises a variable impedance member or resistor 318 and a potential transformer 340 having a primary winding 312 and a secondary winding 314. The primary winding 312 of the potential transformer 340 is connected between phases 1 and 2 of the generator 12 or, in other words, to the line conductors 14 and 16, respectively, thereby rendering the circuit means 310, responsive to a measure of the terminal voltage of the generator 12. A voltage proportional to the terminal voltage of the generator 12 therefore appears across the secondary winding 34 of the potential transformer 340. On the other hand, the variable resistor 318 is connected to a current transformer 316, thereby rendering the circuit means 310 responsive to a measure of the output current of the generator 12. As illustrated, the variable resistor 318 is connected in series circuit relationship with the secondary winding 314 of the potential transformer 340. When so connected, a voltage whose magnitude varies with the power factor of the load connected to the load conductors 14, 16 and 18 appears across the series circuit including the resistor 318 and the secondary winding 314 (of the transformer 340). This can be seen more clearly by referring to Figs. 2 and 3 in which the vectors $e_1$, $e_2$ and $e_3$ represent the three phase-to-neutral terminal voltages of the generator 12 at the line conductors 14, 16 and 18, respectively. The vector $i_3$ represents the load current flowing in the load conductor 18 for a load having a unity power factor. The vectors $i_3'$ and $i_3''$ represent load currents for a load having a lagging power factor and a leading power factor, respectively. The vector $e_{1-2}$ represents the line-to-line voltage between the load conductors 14 and 16.

Figure 3:
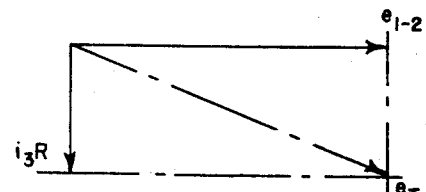

Referring to Fig. 3, it is to be noted that the current is measured on the line conductor 18 in order to shift its phase with respect to the line-to-line voltage $e_{1-2}$, by substantially 90°. The voltage drop across the variable resistor 318, for a particular value of resistance, R, is represented by the vector $i_3R$ shown in Fig. 3 for a unity power factor load. By vectorially adding the alternating current voltage across the resistor 318 to the alternating current voltage across the secondary winding 314, a resultant voltage vector, $e_T$, is obtained as shown in Fig. 3. For a particular magnitude of load current $i_3$ the magnitude of the resultant voltage vector, $e_T$, will vary with the power factor of the load connected to the load conductors 14, 16 and 18. For example, if the load has a leading power factor as indicated by the vector $i_3''$ shown in Fig. 2, the magnitude of the resultant vector voltage $e_T$ will be greater than for a load current having the same magnitude but for a load of unity power factor. On the other hand, if the load current is assumed to be for a load having a lagging power factor as represented by the vector $i_3'$ shown in Fig. 2, the magnitude of the resultant voltage vector, $e_T$, will be less than for a load current having the same magnitude but for a load of unity power factor connected to the load conductors 14, 16 and 18. In summary, the magnitude of the vector sum of the voltages across the secondary winding 314 and the variable resistor 318 will vary with the power factor of the load (not shown) connected to the load conductors 14, 16 and 18 and with the magnitude of the load current flowing in the load conductors 14, 16 and 18.

The power factor sensing circuit 300 also includes a magnetic amplifier 36 for amplifying the resultant voltage vector across the secondary winding 314 and the variable resistor 318. Broadly speaking, the output of the magnetic amplifier 36 is applied to the additional windings 21', 22', 25', 26', 27' and 28' in order to reduce the excitation supplied by the current transformers 21, 22, 25, 26, 27 and 28, respectively, for loads connected to the load conductors 14, 16 and 18 having a leading power factor.

In this instance, the magnetic amplifier 36 comprises the magnetic core members 350 and 352. The load windings 354 and 356 are disposed in inductive relationship with the magnetic core members 350 and 352, respectively. In order to supply energy to the load windings 354 and 356, a transformer 390 having a primary winding 394 and a secondary winding 392 is interconnected with a full wave dry type load rectifier 322 and with the load windings 354 and 356. The primary winding 394 of the transformer 390 is connected to the load conductors 16 and 18. Self-saturation of the magnetic amplifier 36 is obtained by connecting in series circuit relationship with the load windings 354 and 356, the self-saturating rectifiers 378 and 380, respectively, so that current flows in one direction in the load windings 354 and 356. In order to form a doubler circuit, the series circuit including the load winding 354 and the self-saturating rectifier 378 is connected in parallel circuit relationship with the series circuit including the load winding 356 and the self-saturating rectifier 380. One end of the secondary winding 392 of the transformer 390 is electrically connected to the junction point of the self-saturating rectifiers 378 and 380. The other end of the secondary winding 392 is connected to one of the input terminals of the load rectifier 322. The load rectifier 322 is connected in circuit relationship with the load windings 354 and 356 in order to provide a direct current output for the magnetic amplifier 36.

In order to render the magnetic amplifier 36 responsive to the output voltage of the circuit means 310, the control windings 364 and 366 are disposed in inductive relationship with the magnetic core members 350 and 352, respectively. In particular, the control windings 364 and 366 are connected in series circuit relation with one another, the series circuit being connected across the output terminals of a full wave rectifier 320, the input terminals of the rectifier 320 being connected across the secondary winding 314 of the transformer 340 and the variable resistor 318 in order to rectify the voltage which is the vector sum of the alternating current voltages across the secondary winding 314 and the variable resistor 318.

In order to bias the magnetic amplifier 36 by a predetermined amount, the magnetic core members 350 and 352 are disposed in inductive relationship there with the bias windings 374 and 376, respectively. As illustrated, the bias windings 374 and 376 are connected in series circuit relationship with one another across the output terminals of a substantially constant direct current source.

The output signal of the magnetic amplifier 36 appears at the output terminals 325 and 335 of the full wave dry type rectifier 322. The additional windings 21', 22', 25', 26', 27' and 28', associated with the current transformers 21, 22, 25, 26, 27 and 28, respectively, are connected in series circuit relationship with one another, the series circuit being connected across the output terminals 325 and 335 of the magnetic amplifier 36. The additional windings 21', 22', 25', 26', 27' and 28' are disposed in inductive relationship on common cores with the associated current transformers 21', 22', 25', 26', 27' and 28', respectively, so that the current which flows through the additional windings 21', 22', 25', 26', 27' and 28' produces a flux in the common magnetic cores of each of the current transformers 21, 22, 25, 26, 27 and, 28, respectively, which opposes the flux produced in the common magnetic cores of each of the current transformers 21, 25, and 27 during one-half cycle and opposes the flux in the common magnetic cores of each of the current transformers 22, 26 and 28 during the other half cycle by current flow in the load conductors 14, 16 and 18, respectively.

During the portion of each half-cycle when the effective ampere turns due to the load current flowing in the line conductors 14, 16 and 18 oppose the ampere turns produced by the current flowing in each of the additional windings 21', 22', 25', 26', 27' and 28' and when the former ampere turns overcome or are in excess of the latter ampere turns, the common magnetic core of each of the current transformers 21, 22, 25, 26, 27 and 28 will be unsaturated. The net flux in each core will then vary with the load current until the core returns to a saturated state. Therefore, there will be an induced current in the output winding of each of the current transformers 21, 22, 25, 26, 27 and 28 during a portion of each cycle of the load current flowing in the line conductors 14, 16 and 18. In other words, during the portion of each cycle when the core of each of the said current transformers is unsaturated, the instantaneous sum of the ampere turns produced by the current flow in the load conductors 14, 16 and 18, the current flow in the additional windings 21', 22', 25', 26', 27' and 28', and the current flow in the output windings of the current transformers 21, 22, 25, 26, 27 and 28 must be substantially equal to zero. The average value of the total induced current in the current transformers 21, 22, 25, 26, 27 and 28 will vary with the ampere turns produced by the current flow in the corresponding additional windings 21', 22', 25', 26', 27' and 28' which in turn depend on the output signal from the power factor sensing circuit 300. The component of excitation supplied by the current transformers 21, 22, 25, 26, 27 and 28 at the input of the rectifier 42 will therefore vary with the output signal from the power factor sensing circuit 300.

It should be noted that for best operation of the current transformers 21, 22, 25, 26, 27 and 28, the common magnetic core included as part of each of the said current transformers should preferably be made of a substantially rectangular core loop magnetic material.

In operation of the power factor sensing circuit 300, the circuit means 310 functions to provide an output voltage which varies with the power factor of the load which is connected to the load conductors 14, 16 and 18. The output voltage of the circuit means 310 is then rectified by the rectifier 320 and applied as an input signal to the magnetic amplifier 36. The magnetic amplifier 36 then amplifies the latter input signal and produces at its output terminals 325 and 335 an output signal or current which varies with the power factor and magnitude of what ever load is connected to the load conductors 14, 16 and 18. The output signal or current from the magnetic amplifier 36 causes a current to flow in the additional windings 21', 22', 25', 26', 27' and 28' which decreases or reduces the net output current from the current transformers 21, 22, 25. 26, 27 and 28, respectively, by a greater amount when a load having a leading power factor is connected to the load conductors 14, 16 and 18 than when a unity power factor or lagging power factor load is connected to the load conductors 14, 16 and 18.

Figure 4:
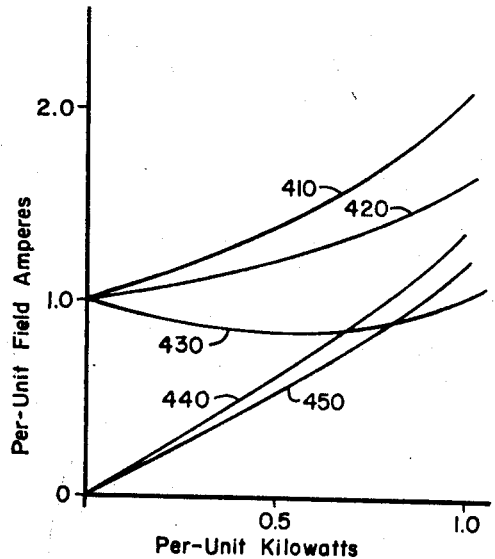
Fig. 4 is a graph, the curves of which illustrate the proportion of the excitation supplied by the current transformers in a conventional static excitation system.

The operation of the power factor sensing circuit 300 and the additional windings 21', 22', 25', 26', 27' and 28' associated with the current transformers 21, 22, 25, 26, 27 and 28, respectively, can best be understood by comparing the operation of a conventional static excitation system with the operation of the excitation system here disclosed. Referring to Fig. 4, the curves 410, 420 and 430 for a typical alternating current generator having a conventional static excitation system are illustrated for a lagging power factor load, a unity power factor load and a leading power factor load, respectively. The curves 410, 420 and 430 represent per unit field amperes as a function of per unit kilowatts for a constant value of terminal voltage such as rated terminal voltage. Per unit field amperes, therefore, are plotted on the vertical axis and per unit kilowatts are plotted on the horizontal axis. The curves 410, 420 and 430 indicate the total field current or excitation requirements of a typical alternating current generator, such as the generator 12. The curves 440 and 450 indicate the excitation which is supplied by the current transformers in a typical, conventional static excitation system for various power factor loads. Comparing the curves 410 and 430, it is seen that the total excitation requirements are much less for a leading power factor load, as represented by the curve 430, than for a lagging power factor load, as represented by the curve 410. The curve 450 indicates the excitation normally supplied by the current transformers in a conventional excitation system for a unity power factor load. The curve 440 represents the excitation supplied by current transformers in a conventional, static excitation system for either a leading or lagging power factor load of the same magnitude. It will be noted that the operation of a conventional static excitation system will be satisfactory for a unity power factor load or for a lagging power factor load but that a conventional static excitation system will provide excessive excitation for a leading power factor load above a particular value, and prevent stable operation in that region of loading.

Figure 5:
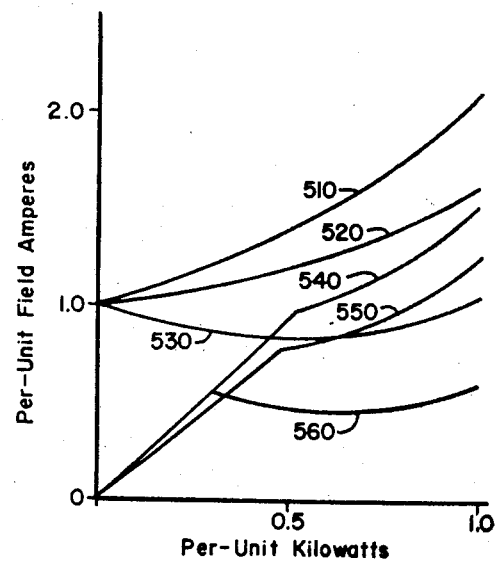
Fig. 5 is a graph, the curves of which illustrate the proportion of the excitation supplied by the current transformers in a static excitation system embodying the teachings of this invention.

Referring now to Fig. 5, the operation of a static excitation system embodying the features of this invention will be described. The curves 510, 520, and 530 are equivalent to the curves 410, 420 and 430 shown in Fig. 4. The curves 510, 520 and 530 illustrate the total excitation requirements for a lagging power factor load, a unity power factor load and a leading power factor load respectively for a typical alternating current generator, such as the generator 12. The curves 540, 550 and 560 indicate the excitation provided by the current transformers 21, 22, 25, 26, 27 and 28 as modified by the operation of the additional windings 21', 22', 25', 26', 27' and 28', respectively, and the power factor sensing circuit 300. The curves 540, 550 and 560 are for a lagging power factor load, a unity power factor load and a leading power factor load, respectively. It will be seen that the proportion of the total excitation requirements provided by the current transformers 21, 22, 25, 26, 27 and 28 as represented by the curve 560 in Fig. 5 will always be less than the total excitation requirements for a leading power factor load as represented by the curve 530. In addition, the proportion of the total excitation requirement supplied by said current transformers for a lagging power factor load as represented by the curve 540 and for a unity power factor load as represented by the curve 550 will also be less than the total excitation requirements as represented by the corresponding curves 510 and 520, respectively.

In summary, the effect of the power factor sensing circuit 300 and the additional windings 21', 22', 25', 26', 27' and 28' on the operation of the current transformers 21, 22, 25, 26, 27 and 28, respectively, is to insure that the current transformers 21, 22, 25, 26, 27 and 28 provide a proper share of the total excitation requirements at the input of the rectifier 42 whose output terminals are connected to the field winding 23 of the generator 12. The components of the power factor sensing circuit 300 should be selected and adjusted so that when a fault occurs across the load conductors 14, 16 and 18 connected to the output terminals 15, 17 and 19 of the generator 12, the output signal from the power factor sensing circuit 300 will be relatively low and the fault current which flows in the load conductors 14, 16 and 18 will then provide sufficient excitation to the generator 12 at the output of the current transformers 21, 22, 25, 26, 27 and 28 for the duration of the fault while the regulator system 13 is unable to operate or supply excitation because of inadequate voltage at the load conductors 14, 16 and 18. It should be noted that the current transformers 21, 22, 25, 26, 27 and 28 are provided in pairs associated with each of the load conductors 14, 16 and 18 so that any current induced in the additional windings 21', 22', 25', 26', 27' and 28' by the current which flows in the load conductors 14, 16 and 18 will be substantially cancelled out because of the opposing induced currents in each pair of the additional windings 21' and 22', 25' and 26' and 27' and 28'. The latter arrangement prevents any induced alternating currents in the additional windings 21', 22', 25', 26', 27' and 28' from interfering with the operation of the magnetic amplifier 36. It is to be understood that the power factor sensing circuit 300 could be arranged or adjusted so that the current transformers 21, 22, 25, 26, 27 and 28 would supply all the excitation current to the field winding 23 required for the minimum excitation necessary to maintain the generator 12 in synchronism with any other generators (not shown) that might be connected to the load conductors 14, 16 and 18, thus eliminating the need for a separate minimum excitation unit (not shown) which would cooperate with the regulator system 13.

Thus, from the foregoing, it can be realized that the current transformers 21, 22, 25, 26, 27 and 28 can be arranged in a static excitation system to provide a proper share of the total excitation requirements of the generator 12 for loads of all power factors without supplying excessive excitation for loads having a leading power factor.

The regulator system 13 will now be described. In general, the regulator system 13 comprises a push-pull, first stage magnetic amplifier 32, responsive to the output voltage of the generator 12 and a second stage, three-phase magnetic amplifier 34 which is responsive to the output signal of the first stage magnetic amplifier 32 and disposed to control the balance or remainder of the excitation requirements of the generator 12.

As illustrated, the push-pull magnetic amplifier 32 is of standard construction and comprises two main sections 46 and 48. The section 46 comprises two magnetic core members 50 and 52 and the section 48 comprises two magnetic core members 54 and 56. In this instance, the load windings 58, 60, 62 and 64 are disposed in inductive relationship with the magnetic core members 50, 52, 54 and 56, respectively. As is customary, self-saturation for the magnetic amplifier 32 is obtained by connecting in series circuit relationship with the load windings 58, 60, 62 and 64, the self-saturating rectifiers 66, 68, 70 and 72, respectively.

In order to form a doubler circuit of the section 46, the series circuit including the load winding 58 and the self-saturating rectifier 66 are connected in parallel circuit relationship with the series circuit including the load winding 60 and the self-saturating rectifier 68. In like manner, in order to form a doubler circuit of the section 48, the series circuit including the load winding 62 and the self-saturating rectifier 70 are connected in parallel circuit relationship with the series circuit including the load winding 64 and the self-saturating rectifier 72.

The energy for the load windings 58, 60, 62 and 64 of the magnetic amplifier 32 is received from a transformer 74 having a primary winding 76 which, in this instance, is responsive to the output voltage of the generator 12 and secondary winding sections 78 and 80. As illustrated, a full wave dry type load rectifier 82 is interconnected with the hereinbefore described parallel circuit of the section 46 and with the secondary winding section 78 of the transformer 74 in order to produce a direct current output for the section 46. In like manner, a full wave dry type load rectifier 84 is interconnected with the hereinbefore described parallel circuit of the section 48 and with the secondary winding section 80 of the transformer 74 in order to obtain a direct current output for the section 48. The primary winding 76 of the transformer 74 is connected to the conductors 161 and 163 which are in turn responsive to the output voltage of the generator 12 being connected to the output of the transformer 140 which will be described hereinafter.

In this instance, the variable resistor 86 is responsive to the output of the load rectifier 82 and the variable resistor 87 is responsive to the output of the load rectifier 84. The variable resistors 86 and 87 are connected in series circuit relationship so that the voltage across the resistor 86 opposes the voltage across the resistor 87, the net voltage across the resistors 86 and 87 in series circuit being the output signal of the magnetic amplifier 32.

For the purpose of biasing each of the sections 46 and 48 of the magnetic amplifier 32 to approximately half output, the biasing windings 90, 92, 94 and 96 are disposed in inductive relationship with the magnetic core members 50, 52, 54 and 56, respectively. In particular, the bias windings 90, 92, 94 and 96 are connected in series circuit relationship with one another, the series circuit being connected to the terminals of a substantially constant direct current voltage source. In operation, the current flow through the bias windings 90, 92, 94 and 96 produces a magnetomotive force with respect to the magnetic core members that opposes the magnetomotive force produced by the current flow through the load windings 58, 60, 62 and 64, respectively.

In order to obtain a reference point from which to operate in each of the sections 46 and 48 of the magnetic amplifier 32, the reference windings 102, 104, 106 and 108 are disposed in inductive relationship with the magnetic core members 50, 52, 54 and 56, respectively. The reference windings 102, 104, 106 and 108 are so disposed on their respective magnetic core members 50, 52, 54 and 56 that the current flow through the reference windings 102 and 104 produces a magnetomotive force that opposes the magnetomotive force produced by the respective bias windings 90 and 92 and that the current flow through the reference windings 106 and 108 produces a magnetomotive force that is additive to the magnetomotive force produced by the respective bias windings 94 and 96. As illustrated, the reference windings are connected in series circuit relationship with one another, the series circuit being connected to the output terminals of a full wave dry type rectifier 110. In order that the current flow through the reference windings 102, 104, 106 and 108 remains substantially constant, the input terminals of the rectifier 110 are connected to a constant potential device 112 which produces at its output a substantially constant alternating current voltage irrespective of the magnitude of the output voltage of the generator 12 to which the constant potential device is responsive, the constant potential device being connected to the conductors 162 and 164 at the output of the transformer 140 whose primary windings are responsive to the output voltage of the generator 12 at the load conductors 14, 16 and 18 as will be described hereinafter.

The control windings 114, 116, 118 and 120 of the magnetic amplifier 32 are disposed in inductive relationship with the magnetic core members 50, 52, 54 and 56, respectively. The control windings 114, 116, 118 and 120 are connected in series circuit relationship with one another, the series circuit being connected across the output terminals of a three phase, full wave, dry type rectifier 130 through a variable resistor 85. The input terminals of the rectifier 130 are responsive to the output voltage of the generator 12, being connected to the secondary windings 134 of the potential transformers 136 whose primary windings 132 are connected to the load conductors 14, 16 and 18. The variable resistor 85 is provided in order that the regulated value of voltage at which the regulator system 13 maintains the output voltage of the generator 12 can be varied.

The control windings 114, 116, 118 and 120 are so disposed on their respective magnetic core members 50, 52, 54 and 56 that when current flows therethrough, a magnetomotive force is produced in the respective magnetic core members that opposes the magnetomotive force produced by the current flow through the respective reference windings 102, 104, 106 and 108. The output voltage of the generator 12 is at its regulated value when the magnetomotive forces produced by the current flow through the control windings 114, 116, 118 and 120 are equal to the respective magnetomotive forces produced by the current flow through the reference windings 102, 104, 106 and 108.

In the operation of the magnetic amplifier 32, when the output voltage of the generator 12 increases to a value above its regulated value, the current flow through the control windings 114, 116, 118 and 120 increases to thereby decrease the output current from the section 46 and increase the output current from the section 48 of the push-pull magnetic amplifier 32. This output increases the current flow through the resistor 87 and decreases the current flow through the resistor 86 to thereby result in a net output signal or voltage at the output terminals 93 and 95 of the magnetic amplifier 32 which is positive at the terminal 95 with respect to the voltage at the output terminal 93. This output signal reduces the output of the magnetic amplifier 34 as will be described hereinafter and the input to the rectifier 44 and the field winding 23 of the generator 12 to return the output voltage of the generator 12 to its regulated value.

On the other hand, when there is a decrease in the output voltage of the generator 12 to a value below its regulated value, the current flow through the control windings 114, 116, 118 and 120 of the magnetic amplifier 32 decreases. A decrease in the current flow through the control windings 114, 116, 118 and 120 unbalances the push-pull magnetic amplifier 32 in such a direction that the output signal or current from the section 46 of the magnetic amplifier 36 increases and the output current from the section 48 decreases. This action increases the magnitude of the current flow through the resistor 86 and decreases the magnitude of the current flow through the resistor 87. This, in turn, as will be explained hereinafter, causes the magnetic amplifier 34 to increase the excitation applied to the field winding 23 of the generator 12 and causes the magnitude of the output voltage of the generator 12 to return to its regulated value.

As hereinbefore described, the three-phase magnetic amplifier 34 is responsive to the output of the magnetic amplifier 32. As illustrated, the magnetic amplifier 34 comprises a plurality of magnetic core members 140, 142, 144, 146, 148 and 150 which have disposed in inductive relationship therewith, the load windings 152, 154, 156, 158, 160 and 162, respectively. In this instance, the load windings 152 and 154 are connected in parallel circuit relationship with one another, the load winding 152 being connected in series circuit relationship with a self-saturating rectifier 164 and the load winding 154 being connected in series circuit relationship with the self-saturating rectifier 116 in order to produce self-saturation for the core members 140 and 142, respectively. The load windings 156 and 158 are likewise connected in parallel circuit relationship with one another, the load winding 156 being connected in series circuit relationship with the self-saturating rectifier 168 and the load winding 158 being connected in series circuit relationship with the self-saturating rectifier 170 in order to produce self-saturation for the core members 144 and 146, respectively. In like manner, the load windings 160 and 162 are connected in parallel circuit relationship with one another, the load winding 160 being connected in series circuit relationship with a self-saturating rectifier 172 and the load winding 162 being connected in series circuit relationship with a self-saturating rectifier 174 in order to produce self-saturation for the magnetic core members 148 and 150, respectively.

In order to supply energy to the load windings 152, 154, 156, 158, 160 and 162, the secondary windings 142, 144 and 146 of a three-phase transformer 140 are connected to the junction point of the load windings 152 and 154, to the junction point of the load windings 156 and 158, and to the junction point of the load windings 160 and 162, respectively, by means of the conductors 161, 163 and 164, respectively. The primary windings 153, 155 and 157 of the three-phase transformer 140 are responsive to the output voltage of the generator 12 being connected in a delta arrangement to the load conductors 14, 16 and 18.

On the other hand, in order to supply energy from the output of the magnetic amplifier 34 to a three-phase dry type rectifier 44, a conductor 143 is connected between the junction point of the self-saturating rectifiers 164 and 166 and the input terminal 183 of the rectifier 44. In like manner, a conductor 145 is connected between the junction point of the self-saturating rectifiers 168 and 170 of the magnetic amplifier 34 and the input terminal 185 of the rectifier 44. Another conductor 147 is connected between the junction point of the self-saturating rectifiers 172 and 174 and the input terminal 187 of the rectifier 44. The output terminals of the rectifier 44 are connected in parallel circuit relationship with the output terminals of the rectifier 42, the outputs of both the rectifiers 42 and 44 being connected to supply excitation current to the field winding 23 of the generator 12.

In order to vary the magnetic saturation of the core members 140, 142, 144, 146, 148 and 150 in accordance with the output signal from the magnetic amplifier 32 at the output terminals 93 and 95, a plurality of control windings 200, 202, 204, 206, 208 and 210 are disposed in inductive relationship with the core members 140, 142, 144, 146, 148 and 150, respectively. The control windings 200, 202, 204, 206, 208, and 210 are connected in series circuit relationship with one another, the series circuit being connected across the output terminals 93 and 95 of the magnetic amplifier 32.

A plurality of bias windings 184, 186, 188, 190, 192 and 194 are also disposed in inductive relationship with the magnetic core members 140, 142, 144, 146, 148 and 150, respectively, in order to bias said magnetic core members by a predetermined amount. The bias windings 184, 186, 188, 190, 192 and 194 are connected in series circuit relationship with one another, the series circuit being connected across the terminals of a substantially constant direct current source. In operation, the current flow through the bias windings 184, 186, 188, 190, 192 and 194 produces a magnetomotive force in the magnetic core members 140, 142, 144, 146, 148 and 150, respectively, that opposes the magnetomotive force produced by the current flow through the load windings 152, 154, 156, 158, 160 and 162, respectively.

For the purpose of more clearly understanding the sequence of current flow through the load windings 152, 154, 156, 158, 160 and 162, let us assume that the voltage at the conductor 163 is positive with respect to the voltage at the conductor 161. When this condition exists, current will flow from the conductor 163 through the load winding 158 of the magnetic amplifier 34, the self-saturating rectifier 170, the conductor 145, the input terminal 185 of the rectifier 44 through one of the legs of the rectifier 44 to the upper output terminal of the rectifier 44, through the lead 33 to the field winding 23 of the generator 12 and through the lead 35 back to the lower output terminal of the rectifier 44, through a leg of the rectifier 44 to the input terminal 183 of the rectifier 44, the conductor 143, the self-saturating rectifier 164, the load winding 152 and back to the conductor 161. Moving to the next phase, current will flow from the conductor 164 through the load winding 154, the self-saturating rectifier 166, the conductor 143, the input terminal 183 of the rectifier 44, through a leg of the rectifier 44 to the upper output terminal of the rectifier 44, through the lead 33 to the field winding 23 and through the lead 35 back to the lower output terminal of the rectifier 44, through a leg of the rectifier 44 to the input terminal 185, the conductor 145, the self-saturating rectifier 168, the load winding 156 and back to the conductor 163. Finally in the third phase, the current will flow from the conductor 161 through the load winding 162 of the magnetic amplifier 34, the self-saturating rectifier 174, the conductor 147 to the input terminal 187 of the rectifier 44, through a leg of the rectifier 44 to the upper output terminal of the rectifier 44, through the lead 33 to the field winding 23 of the generator 12 and back to the lower output terminal of the rectifier 44 through the lead 35, through a leg of the rectifier 44 to the input terminal 187 of the rectifier 44, the conductor 147, the self-saturating rectifier 172, the load winding 160 and back to the conductor 164.

The operation of the regulator system 13 will now be described. When the output voltage of the generator 12 departs or deviates from its regulated value, a net output signal will appear at the output terminals 93 and 95 of the magnetic amplifier 32, the polarity of the output signal depending upon whether the output voltage of the generator 12 is above or below the regulated value of the output voltage of the generator 12. Current will then flow through the control windings 200, 202, 204, 206, 208 and 210 of the magnetic amplifier 34. Depending upon the direction of the flow of current through the control windings 200, 202, 204, 206, 208 and 210, the output of the magnetic amplifier 34 will either be increased or decreased, depending upon the polarity of the output signal or voltage at the output terminals 93 and 95 of the magnetic amplifier 32. The input to the rectifier 44 from the magnetic amplifier 34 will then be either increased or decreased so as to cause the excitation applied to the field winding 23 to be either increased or decreased so as to return the output voltage of the generator 12 to its regulated value.

In summary, the boost excitation system 24 will supply a portion of the total excitation requirements of the generator 12. The balance of the excitation will be supplied by the regulator system 13 in order to maintain the output voltage of the generator 12 at its regulated value. The effect of the power factor sensing circuit 300 and the additional windings 21', 22', 25', 26', 27' and 28', as previously explained, is to prevent excessive excitation from being supplied by the current transformers 21, 22, 25, 26, 27 and 28 when the power factor of the load is leading and above a particular value of load current.

It is to be understood that for certain applications a single stage magnetic amplifier may be sufficient for the regulator system 13. In addition, other types of static regulator systems may be substituted for the regulator system 13 shown, such as those employing semiconductor devices. It is also to be understood that other types of well-known means, such as phase sensitive relays, may be employed to obtain an output signal which varies with the power factor of the load connected to the load conductors 14, 16 and 18.

The apparatus embodying the teachings of this invention has several advantages. One important advantage is that a static excitation system embodying the teachings of this invention is suitable for use in systems which, at least at times, are subject to leading power factor load conditions. The static excitation system disclosed allows the user to take greater advantage of the leading power factor capabilities of an alternating current generator such as the generator 12. In addition, the excitation system embodying the teachings of this invention employs only static components and therefore requires only a minimum of maintenance.

Since numerous changes may be made in the above-described apparatus and circuits and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In an excitation system for a dynamoelectric machine having an excitation field winding and disposed to supply a load through output terminals, first means responsive to the output load current of said dynamoelectric machine for supplying a portion of the excitation current to said excitation field winding, second means responsive to the output voltage of said dynamoelectric machine for supplying the balance of the excitation current to said excitation winding to thereby maintain the output voltage of said dynamoelectric machine at a predetermined value, third means for obtaining a control signal which varies with the power factor of said load, and fourth means responsive to said control signal, said fourth means being connected in circuit relation between said third means and said first means for reducing the excitation current supplied by said first means when said load has a leading power factor.

2. In an excitation system for a dynamoelectric machine having an excitation field winding and disposed to supply a load through output terminals, first means responsive to the output load current of said dynamoelectric machine for providing a portion of the excitation current applied to said field winding, rectifying means connected in circuit relationship between said first means and said field winding, second means responsive to the output voltage of said dynamoelectric machine for providing the balance of the excitation current applied to said field winding to thereby maintain said output voltage at a predetermined value, the output of said second means connected in circuit relationship with said field winding, third means for obtaining an output signal which varies with the power factor of said load and fourth means responsive to said output signal of said third means, said fourth means being connected in circuit relationship with said first means for reducing the excitation current provided by said first means when the power factor of said load is leading.

3. In an excitation system for a synchronous machine having an excitation field winding and disposed to supply a load through output terminals, the combination comprising a plurality of current transformers having output windings responsive to the output current of said synchronous machine, said output windings of said current transformers being connected to provide a portion of the excitation current applied to said excitation field winding, first means for obtaining an output signal which varies with the power factor of said load, additional windings on said current transformers responsive to said output signal of said first means, said additional windings being connected to said first means to reduce the excitation current applied to said field winding by said current transformers for said load having a leading power factor, and second means responsive to the output voltage of said synchronous machine for providing the balance of the excitation current applied to said field winding, said second means being connected to said field winding to control the total excitation current applied to said field winding to thereby maintain said output voltage of said synchronous machine at a predetermined value.

4. In a regulating system for a synchronous machine having an excitation field winding and disposed to supply a load having a varying power factor through output terminals, the combination comprising, a plurality of current transformers having output windings responsive to the output load current of said synchronous machine, said output windings of said current transformers bieng connected to provide a portion of the excitation current applied to said excitation field winding, first means for obtaining an output signal which varies with the power factor of said load, additional windings on said current transformers responsive to said output signal of said first means, said additional windings being connected to said first means to decrease the excitation current applied to said field winding by said current transformers for said load having a leading power factor, second means for providing a reference voltage, third means for comparing the output voltage of said synchronous machine with said reference voltage, and fourth means connected in circuit relationship between said third means and said field winding for providing the balance of the excitation current applied to said excitation field winding in accordance with the larger of said compared voltages to thereby maintain said output voltage at a predetermined value.

5. In a regulating system for a synchronous machine having an excitation field winding and disposed to supply a load having a varying power factor through output terminals, the combination comprising, a plurality of current transformers having output windings responsive to the output load current of said synchronous machine, said output windings of said current transformers being connected to provide a portion of the excitation current applied to said excitatiton field winding, first means for obtaining an output signal which varies with the power factor of said load, additional windings on said current transformers responsive to said output signal of said first means, said additional windings being connected to said first means to decrease the excitation current applied to said field winding by said current transformers for said load having a leading power factor, second means for providing a reference voltage, third means for comparing the output voltage of said synchronous machine with said reference voltage, and fourth means connected in circuit relationship between said third means and said field winding for providing the balance of the excitation current applied to said excitation field winding in accordance with the larger of said compared voltages to thereby maintain said output voltage at a predetermined value, said fourth means comprising a magnetic amplifier.

6. In a regulating system for a synchronous machine having an excitation field winding and disposed to supply a load through output terminals, the combination comprising current transformers having output windings responsive to the output current of said synchronous machine for supplying part of the excitation current applied to said field winding, rectifying means connected between said output windings of said current transformers and said excitation field winding, first means for obtaining an output signal which varies with the power factor of said load, additional windings for said current transformers responsive to said output signal of said first means, said additional windings connected in circuit relationship with said first means for reducing the excitation current supplied by said current transformers when the power factor of said load is leading, second means for providing a reference voltage, third means for comparing said reference voltage with the output voltage of said synchronous machine, fourth means connected in circuit relationship with said third means and said field winding for controlling the balance of the excitation current applied to said field winding in accordance with the larger of said compared voltages to thereby maintain said output voltage of said synchronous machine at a predetermined value.

7. In a regulating system for a synchronous machine having an excitation field winding and disposed to supply a load through output terminals, the combination comprising current transformers having output windings responsive to the output current of said synchronous machine for supplying part of the excitation current applied to said field winding, rectifying means connected between said output windings of said current transformers and said excitation field winding, first means for obtaining an output signal which varies with the power factor of said load, additional windings for said current transformers responsive to said output signal of said first means, said additional windings connected in circuit relationship with said first means for reducing the excitation current supplied by said current transformers when the power factor of said load is leading, second means for providing a reference voltage, third means for comparing said reference voltage with the output voltage of said synchronous machine, fourth means connected in circuit relationship with said third means and said field winding for controlling the balance of the excitation current applied to said field winding in accordance with the larger of said compared voltages to thereby maintain said output voltage of said synchronous machine at a predetermined value, said fourth means comprising a magnetic amplifier.

8. In a regulating system for controlling an electrical characteristic of a dynamoelectric machine having an excitation field winding and disposed to supply a load through output terminals, the combination comprising current transformers connected to be responsive to the output current supplied to said load, rectifying means connecting said current transformers to said field winding to supply part of the excitation current applied thereto, first means for obtaining an output signal which varies with the power factor of said load, additional windings on said current transformers responsive to said output signal of said first means, said additional windings being connected to reduce the excitation current supplied by said current transformers when the power factor of said load is leading, and second means responsive to the output voltage of said dynamoelectric machine for supplying the balance of the excitation current applied to said field winding, said second means connected in circuit relationship between said output terminals and said field winding of said dynamoelectric machine to vary the total excitation current in accordance with the output voltage of said dynamoelectric machine to thereby maintain said output voltage at a predetermined value.

No references cited.